(12) United States Patent  
Linn et al.

(10) Patent No.: US 9,361,172 B2  
(45) Date of Patent: Jun. 7, 2016

(54) SYSTEMS AND METHODS FOR SYNCHRONIZING MICROPROCESSORS WHILE ENSURING CROSS-PROCESSOR STATE AND DATA INTEGRITY

(71) Applicant: HARRIS CORPORATION, Melbourne, FL (US)

(72) Inventors: Charles A. Linn, Fairport, NY (US); Jeffrey R. Beane, Scottsville, NY (US); George P. Paskalakis, Mt. Airy, MD (US); Richard G. Schmalbach, Timonium, MD (US); Christopher J. Tilley, Naples, NY (US)

(73) Assignee: Harris Corporation, Melbourne, FL (US)

( * ) Notice: Subject to any disclaimer, the term of this patent is extended or adjusted under 35 U.S.C. 154(b) by 230 days.

(21) Appl. No.: 14/322,161

(22) Filed: Jul. 2, 2014

(65) Prior Publication Data

US 2016/0004581 A1    Jan. 7, 2016

(51) Int. Cl.
| | |
|---|---|
| *G06F 11/00* | (2006.01) |
| *G06F 11/07* | (2006.01) |
| *G06F 11/16* | (2006.01) |
| *G06F 11/20* | (2006.01) |

(52) U.S. Cl.  
CPC .......... *G06F 11/079* (2013.01); *G06F 11/0724* (2013.01); *G06F 11/1641* (2013.01); *G06F 11/1658* (2013.01); *G06F 11/1687* (2013.01); *G06F 11/2017* (2013.01)

(58) Field of Classification Search  
CPC .  G06F 11/1658; G06F 15/163; G06F 11/201; G06F 11/2017  
See application file for complete search history.

(56) References Cited

U.S. PATENT DOCUMENTS

| 5,708,795 A * | 1/1998 | Funaki ................. G06F 15/167 711/147 |
| 6,795,901 B1 * | 9/2004 | Florek ..................... G06F 9/526 710/200 |
| 2002/0056029 A1 * | 5/2002 | Marui ................... G06F 15/163 711/147 |
| 2004/0153587 A1 * | 8/2004 | Choi .................... G06F 13/4022 710/52 |

* cited by examiner

*Primary Examiner* — Charles Ehne  
(74) *Attorney, Agent, or Firm* — Fox Rothschild LLP; Robert J. Sacco; Carol Thorstad-Forsyth (57) ABSTRACT

Systems (100) and methods (300) for synchronizing operations of processors (102, 104). The methods involve: receiving by an electronic circuit (106) a first request (250) from a first processor for writing first data (262) to or reading first data from a first address (260) in a first data store (122), and subsequently a second request (252) from a second processor for writing second data (266) to or reading second data from a second address (264) in a second data store (124); comparing values of the first and second addresses to each other and values of the first and second data to each other; and concurrently communicating an asynchronous ready signal (254) from the electronic circuit to the processors when the values of the addresses and data respectively match each other. The asynchronous ready signal causes operations of the processors to be synchronized in time with each other.

20 Claims, 6 Drawing Sheets

SYSTEMS AND METHODS FOR SYNCHRONIZING MICROPROCESSORS WHILE ENSURING CROSS-PROCESSOR STATE AND DATA INTEGRITY

STATEMENT OF THE TECHNICAL FIELD

The inventive arrangements relate to systems and methods for physical or logical redundancy to ensure fault-detection. More particularly, the inventive arrangements concern systems and methods for synchronizing microprocessors while ensuring cross-processor state and data integrity.

DESCRIPTION OF THE RELATED ART

To meet requirements for certain security-critical functions, physical or logical redundancy is required to ensure fault-detection. Many of these security-critical functions are implemented in software. This redundancy is of the type to detect failures, not to continuing functioning in the face of failure (i.e., redundancy in the normal sense). If a failure is detected, then certain security measures can be performed, such as noting of the event for audit purposes, clearing memory or shutting down the system entirely.

One conventional way to achieve physical redundancy is to run two physically distinct processors in formal (clock-cycle level) lockstep, with each executing the exact same code at the exact same time. In this scenario, each input and/or request is communicated to each processor at the same time. Consequently, each processor is expected to be in identical states at any given time. External hardware circuitry can be used to validate that the multiple processors are behaving identically. This external circuitry also analyzes the operations and/or states of the processors to ensure that the processors are doing the same thing at the exact same time and are in the same states at the exact same time. If an inconsistency in the operations and/or states of the processors is detected, then the external circuitry may cause the entire system to perform pre-defined security measures, such as stopping all operations and/or clearing all memory space. Such an inconsistency can be detected when the outputs of the processors are out of phase with one another.

With this conventional approach, both specialized processors in conjunction with external verification circuitry are required to perform the checks. Custom Application Specific Integrated Circuit ("ASIC") designs are usually required for these types of systems employing this solution. Such ASIC designs are expensive, complex and difficult to upgrade as new processor technology is developed.

SUMMARY OF THE INVENTION

The present invention concerns systems and methods for synchronizing operations of a plurality of processors which are not specifically designed for lockstep synchronized operation, and hence not suitable for use with the conventional approached mentioned above in the background section of this document. The methods involve: receiving by an electronic circuit a first request from a first processor for writing first data to or reading first data from a first address in a first data store; subsequently receiving by the electronic circuit a second request from a second processor for writing second data to or reading second data from a second address in a second data store; and comparing values of the first and second addresses to each other and values of the first and second data to each other. Each of these processors after posting their requests are blocked pending the issuance of an asynchronous ready signal before they can continue processing.

When the values of the first and second addresses match each other and the values of the first and second data match each other, the electronic circuit concurrently communicates an asynchronous ready signal to the first and second processors. The asynchronous ready signal, being issued to the two processors simultaneously, causes operations of the first and second processors to be synchronized in time with each other. After each receives this signal, they may then continue with their normal processing. In some scenarios, the electronic circuit also asserts at least one granted write request or read request made by at least one of the first processor and the second processor. The granted write/read request can be asserted simultaneously with the asynchronous ready signal, allowing the operation requested by both to be accomplished, as they were in identical state.

When the values of the first and second addresses do not match each other or the values of the first and second data do not match each other, the electronic circuit may: communicate a waypoint violation signal to the first and second processors; and/or assert the asynchronous ready signal so that the first and second processors can fully perform requisite security measures. The asynchronous ready signal can be asserted in a manner that is appropriate for the bus protocol (e.g., a FlexBus protocol). For example, the asynchronous ready signals can be continuously or periodically asserted.

In some scenarios, the checking for agreement may only be enforced when a read operation is performed on a shared resource, or only a write operation.

In those or other scenarios, the methods may additionally involve determining by the electronic circuit whether at least one of the first address and the second address is contained in a pre-defined list or policy. If it is determined that at least one of the first address and the second address is contained in the pre-defined list or policy, then the electronic circuit can perform various operations. For example, the electronic circuit may assert at least one granted write request or read request made by at least one of the first processor and the second processor. The electronic circuit may also communicate an asynchronous ready signal to the first and second processors. In this way, one or more address ranges may be either excluded from the normal checking behavior, only allow reads, or only allow write operations.

In those or yet other scenarios, the methods may additionally involve performing operations by the electronic circuit to determine if the first and second processors are both performing write operations or read operations at the same time or within a pre-specified time window. If it is determined that the first and second processors are not both performing write operations or read operations at the same time or within a pre-specified time window, then the electronic circuit may perform various operations. For example, the electronic circuit may communicate a waypoint violation signal to the first and second processors. The electronic circuit may also assert an asynchronous ready signal so that the first and second processors can fully perform requisite security measures. The asynchronous ready signal can be continuously or periodically asserted.

When using general processors which are not specifically designed for synchronous lockstep operation, inherent hardware limitations are such that Interrupt Service Routines ("ISRs") may not always occur at exactly the same time, even though a common hardware signal triggered an interrupt in both. Unless otherwise accommodated, this difference in instruction sequence could result in one processor accessing an input or output request at one address, while the other (not yet running the interrupt service routine) could perform a request at a different location. This could cause a waypoint violation to be detected in the checking hardware during non-faulted operation. To alleviate this, ISRs are not allowed to access waypoint controlled resources. Instead, they can schedule tasks (at a non-ISR level) to perform such accesses on their behalf. In this way, the methods may additionally involve performing operations by the first processor such that a first task is scheduled each time a write to the first data store is to be performed during a first interrupt service routine. The electronic circuit can then perform operations to cause the first processor to make identical dispatch decisions for the first tasks scheduled during the first interrupt service routine performed thereby as those of the second processor for second tasks scheduled during a second interrupt service routine performed thereby.

In the above discussion, two processors and external circuitry were described. The same methods can be employed by extension to more than two processors, where normal operation request all to match address and data, or any pre-determined combination being required to match.

BRIEF DESCRIPTION OF THE DRAWINGS

Embodiments will be described with reference to the following drawing figures, in which like numerals represent like items throughout the figures, and in which.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale.

The present invention may be embodied in other specific forms without departing from its spirit or essential characteristics. The described embodiments are to be considered in all respects as illustrative. The scope of the invention is, therefore, indicated by the appended claims. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Embodiments will now be described with respect to FIGS. 1-3D. Embodiments generally relate to systems employing physical redundancy to ensure fault-detection. Unlike conventional systems, the present invention does not require that the physically distinct processors run in formal (clock-cycle level) lockstep. In this regard, the present invention uses specifically controlled check points to check that the sequence of operations to some shared resource (e.g., a memory resource) is the same. This check point technique provides a self synchronizing solution to the physically distinct processors, which will become more evident as the discussion progresses.

Figure 1:
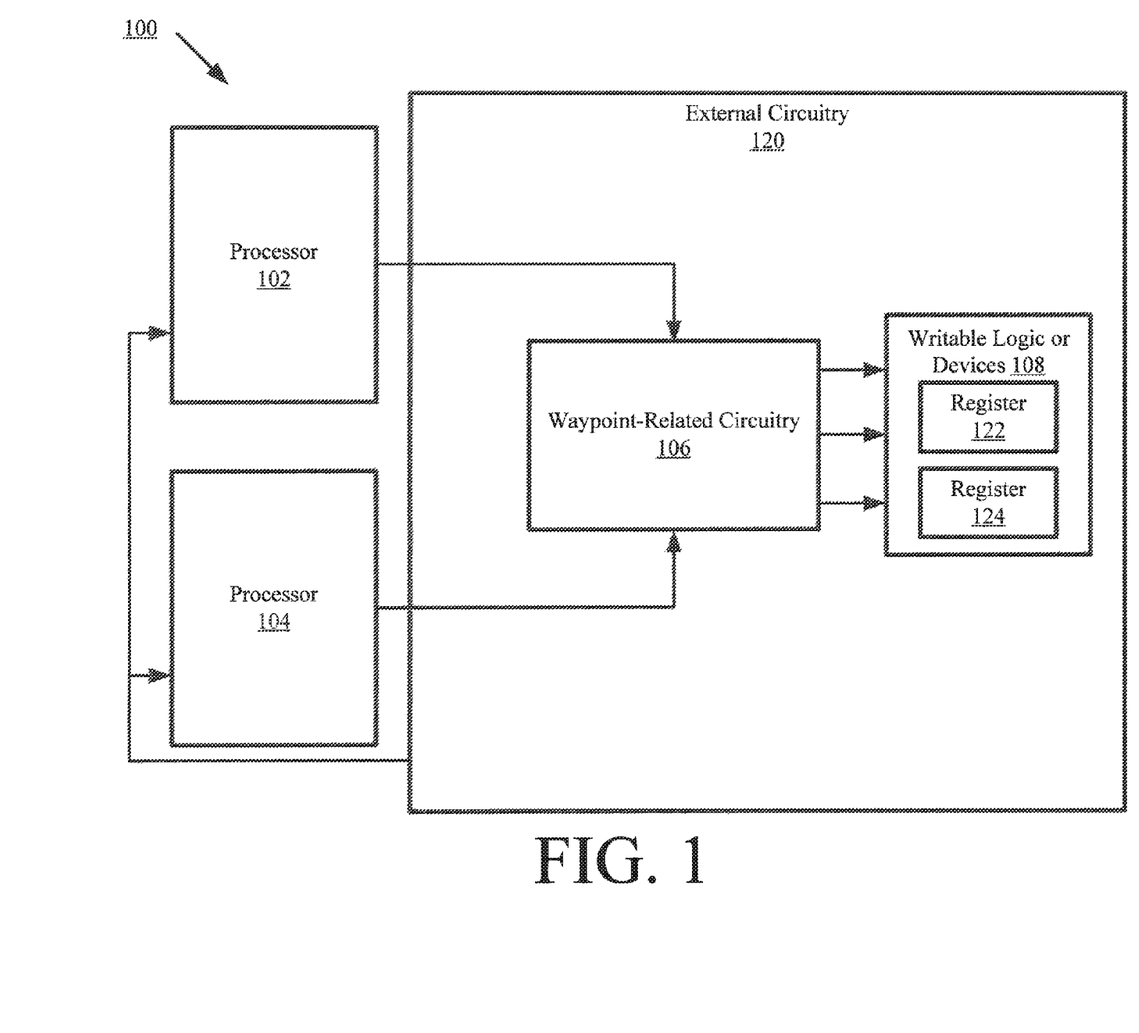
FIG. 1 is a schematic illustration of an exemplary system 100 employing physical redundancy to ensure fault-detection.

Referring now to FIG. 1, there is provided a schematic illustration of an exemplary system 100 employing physical redundancy to ensure fault-detection. System 100 comprises at least two physically distinct processors 102, 104 configured to accomplish identical functions, at least at certain times. However, unlike the conventional lockstep solution, the processors 102, 104 are not being held or required to execute in an exact lockstep form. The access of the processors 102, 104 to controlled resources or devices 108 is through external circuitry 120. In some scenarios, the external circuitry comprises, but is not limited to, a Field Programmable Gate Array ("FPGA"). The external circuitry 120 is a shared resource between the processors 102, 104. For example, in a secure system, a door is unlocked when certain conditions are met. The door is unlocked by outputting an electrical signal from the external circuitry 120, but the door unlock algorithm is held in the processors 102, 104. The processors 102, 104 both have to agree to unlock the door before the door can be unlock. Indeed, if the processors 102, 104 disagree, then the system is caused to perform certain security measures, such as issue an alarm and shut down all operations thereof.

In a traditional system, the door can be unlocked by simply having the processors write values to a register in the external circuitry. As such, each processor will output information indicating that the door should be locked or unlocked. Such information output from both devices may include the same or different value which is to be written to the same address in a memory device 108 (e.g., address 100 of the register). The information is output from the processors in some order, i.e., from a first processor and then from a second processor, or vice versa. Since the output information would be received by the device at different times, the information which is received second will overwrite the information which was received first, thereby accomplishing nothing.

Accordingly, the FPGA or other external circuitry 120 of the present invention includes a circuit that will cause operations of the processor (e.g., processor 102) for which the output information was received first to be held at least until the corresponding output information is received from the other processor (e.g., processor 104). This circuit is referred to herein as the waypoint-related circuitry 106. In some scenarios, the waypoint-related circuitry 106 communicates with the processors 102, 104 via a standard bus design such as a FlexBus. FlexBus is well known in the art, and therefore will not be described in detail herein. A number of other microprocessor memory access busses supporting asynchronous bus devices have similar features. Other types of buses can be used with the present invention. However, the present invention will be described below in relation to the FlexBus scenario.

In the present invention, each processor 102 and 104 as part of their processing perform a sequence of instructions. During normal operation when waypointing is being employed, the sequence of operations performed by both processors is expected to be identical, though not necessarily in exact time alignment. As part of the design, the software executing on each processor will, as a normal part of its design, need to access some external memory, logic or device 108. Those accesses pass through the waypoint check external circuitry 120, which can examine to ensure that both the sequence of accesses and if applicable the data written as part of those accesses are in identical order.

Notably, in the present invention, the output information from processor 102 is written to a first address (e.g., address 100) in a first register 122 of the external circuit 120. At approximately (but not necessarily) the same time processor 104 writes to the same address (e.g., address 100) of the same device 122 of the external circuit 120. Once the output information is received by the external circuit 120 from both processors 102, 104, the values and/or addresses thereof are respectively compared to each other within the waypoint-related circuitry 106. Based on the results of these comparisons, the waypoint-related circuitry 106 performs operations to: (a) allow the write (or read) to proceed to the device register 122 ("unlock the door"); and/or (b) allow the processors 102, 104 to continue further processing by asserting the asynchronous ready signal. As a result of performing operations related to (b), the operations of the processors 102, 104 are re-synchronized in time, in the case of processor reads, address matching is done. If they match, the readable device is then allowed to drive the bus, and hence return the fetched data to both processors simultaneously.

Figure 2:
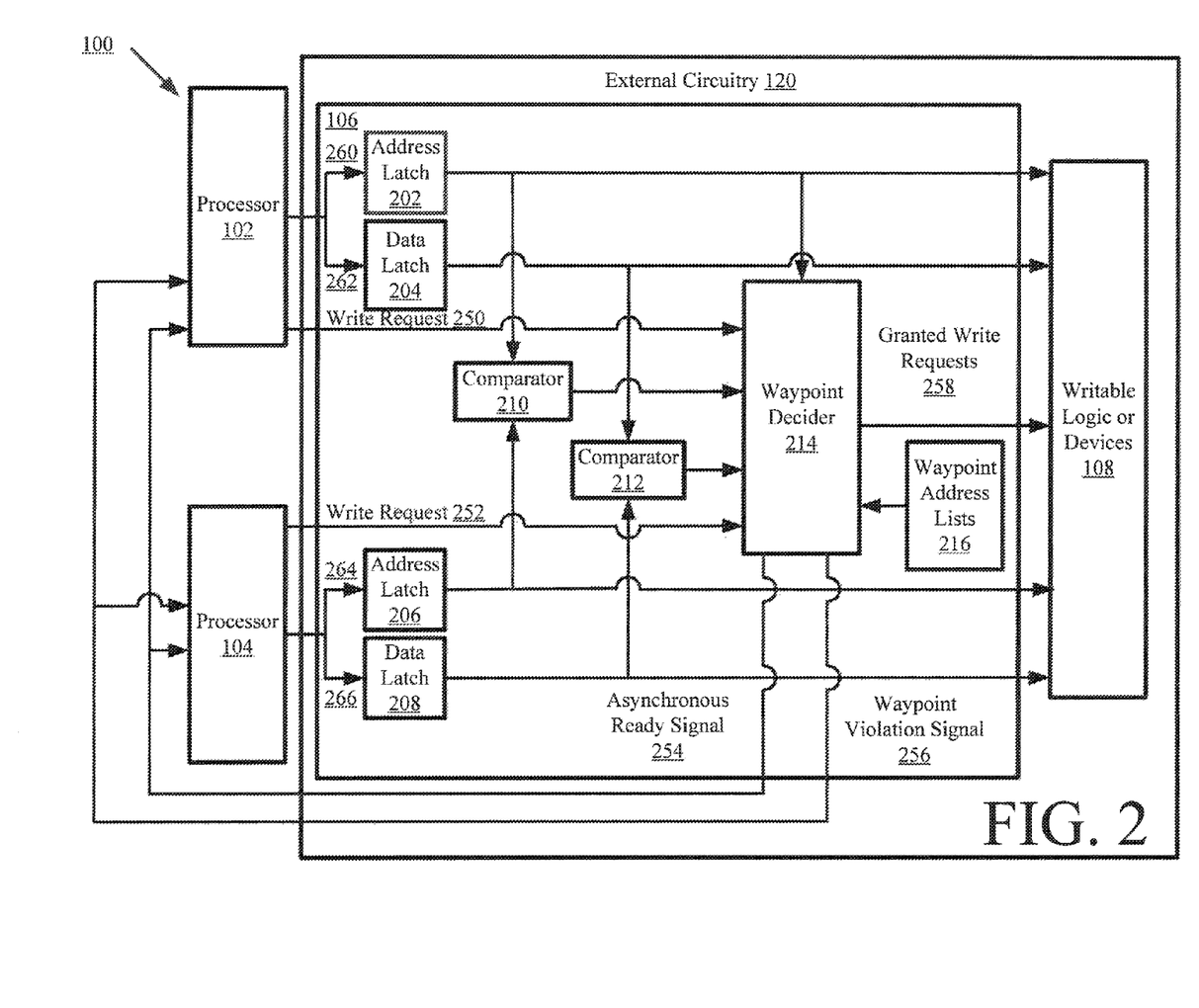
FIG. 2 is a more detailed block diagram of the system shown in FIG. 1 that is useful for understanding the present invention.

Referring now to FIG. 2, there is provided a more detailed block diagram of the exemplary system 100 shown in FIG. 1 that is useful for understanding the particularities of the waypoint-related circuitry 106 thereof. Notably, registers 122, 124 are not shown in FIG. 2 simply for purposes of simplicity. However, it should be noted that the contents of the registers 122, 124 are compared in the waypoint-related circuitry 106, as will be discussed below. In the present case, only one register is used (e.g., device register 122), but in some other scenarios more than one register may be used (e.g., millions of registers).

As shown in FIG. 2, the waypoint-related circuitry 106 comprises address latches 202, 206, data latches 204, 208, comparators 210, 212, a waypoint decider 214, and at least one waypoint address list 216. The address list is/can be used to specify the handling of each, some or all of the shared resource addresses. In some scenarios, system 100 is absent of the waypoint address list 216. In this case, all addresses are waypointed the same way. Each of the components 202-216 comprises hardware and/or software configured to perform all or a portion of methods of the present invention, as discussed herein. The hardware can include, but is not limited to, an electronic circuit.

As mentioned above, the waypoint-related circuitry 106 is configured to cause operations of the processor (e.g., processor 102) for which the output information was received first to be held at least until the corresponding output information is received from the other processor(s) (e.g., processor 104). In this regard, the waypoint-related circuitry 106 communicates a signal to the processor (e.g., processor 102) for this purpose. This signal is a standard signal that most processors typically employ for a very different purpose.

The following discussion is provided in order to describe the conventional use of this signal, and the new novel use of this signal. Conventional processors often run at faster rates than the memory to which data is being written. In some conventional scenarios, an asynchronous ready technique is employed where a handshake is performed. During operation, the processor performs a read or write to the memory. The operations of the processor are then held by design until it receives a response signal from the memory indicating that the read or write has been fully performed thereby. FlexBus is one of many bus protocols that follow this asynchronous ready technique. In the FlexBus context, the response signal is referred to as an asynchronous ready signal. In the present invention, while this asynchronous ready signal is used to hold the first processor (e.g., processor 102), this hold is used for a very different reason and purpose. Rather than using this signal to ensure memory has completed a read or write action, in the present invention this signal is used to hold the first processor until one or more other processors have initiated similar read or write actions, with matching addresses and (if a write) data values. Only after a redundancy check is passed, is the asynchronous ready signal used to allow the processors to continue. Looked at another way, the present invention encapsulates normal peripherals with redundancy checking logic such that the aggregate appears to each processor like standard, asynchronous memory, even though in reality this is not the case.

Referring again to FIG. 2, both processors 102, 104 are configured to perform operations to write to and/or read data from the logic or devices 108 (e.g., writable logic or devices). In the following discussion, the present invention will be described in relation to the data write scenario. However, the invention is not limited in this regard.

In the date write scenario, both processors 102, 104 perform operations to write data to the logic or devices 108. The logic or devices 108 can include registers 122, 124 (not shown in FIG. 2). Each processor 102, 104 contain an address of a memory location to be accessed and data to be written to the address. In the door scenario, the register 122 controls the opening of the door. The data includes data indicating that the door should be opened.

During operations in the data write scenario, the write request 250, address 260 and data 262 are output from the first processor 102. At this time, the first processor 102 enters a halted state while waiting for the reception of an asynchronous ready signal. Also, the write request 250 and data 262 are received by the waypoint-related circuitry 106 first from processor 102. At the waypoint-related circuitry 106, the address 260 is stored in address latch 202. The data 262 is stored in data latch 204. The write request 250 is passed to a waypoint decider 214.

While processor 102 waits for an asynchronous ready signal, the waypoint-related circuitry 106 receives a write request 252, address 264 and data 266 from processor 104. The address 264 is stored in address latch 206. The data 266 is stored in data latch 208. The write request 252 is passed to a waypoint decider 214.

At this time, the waypoint-related circuitry 106 performs operations to determine if both processors are writing data having the same values (e.g., a value of one or a value of zero) to the same address (e.g., address 100). In this regard, the waypoint-related circuitry 106 comprises comparators 210, 212. In comparator 210, the addresses 260, 264 are compared to each other. In comparator 212, the data values 262, 266 are compared to each other. The results of the comparisons are then sent from the comparators 210, 212 to the waypoint decider 214.

If the addresses 260, 264 match each other and the data values 262, 266 match each other, then the waypoint decider 214 asserts granted write requests 258 which strobes in the addresses 260 and data 262 to the logic or devices 108, and more particularly to a registers 122 (not shown in FIG. 2). Simultaneously with the granted write requests 258 assertion, the waypoint decider 214 communicates an asynchronous ready signal 254 to the processors 102, 104 indicating that they can start performing next operations.

If the addresses 260, 264 do not match each other and/or the data values 262, 266 do not match each other, then the waypoint decider 214 does not grant the write request. The waypoint decider 214 also communicates a waypoint violation signal 256 to the processors 102, 104. The waypoint violation signal 256 causes processors 102, 104 to take pre-defined security measures, such as indicating a faulted condition, stopping all operations and/or clearing memory items as required. Notably, the waypoint decider 214 may also assert the asynchronous ready signal 254 in a manner that is appropriate for the bus protocol so that the processors 102, 104 are unblocked so they can fully perform the requisite security measures. For example, the waypoint decider 214 periodically or permanently asserts the asynchronous ready signal 254 when the addresses 260, 264 do not match each other and/or the data values 262, 266 do not match each other.

As shown in FIG. 2, the waypoint-related circuitry 106 further includes at least one waypoint address list 216. In cryptographic scenarios, the processors 102, 104 may generate a random number. If the number is truly random, then the processors 102, 104 write out different random numbers to registers 122, 124, respectively. Only one of the random numbers is subsequently used in following encryption or decryption operations. Accordingly, the external circuitry 120 arbitrarily selects the random number output from one of the processors (e.g., processor 102). Consequently, a waypoint violation would occur even through system 100 is operating correctly. In order to prevent this waypoint violation, the address to which the random numbers are written is listed in the waypoint address list 216 as a special address. Whenever the waypoint decider 214 detects a write to this address, it then: (1) ignores the results of at least the comparison operations performed by comparator 212; (2) asserts a granted write request 258 which strobes in the address 260 or 264 and data 262 or 266 to the logic or devices 108; and/or (3) communicates the asynchronous ready signal 254 to the processors 102, 104 indicating that they can start performing next operations. The address detection can be achieved by, for example, comparing the address value to the values listed in the waypoint address list 216. In this regard, the waypoint decider 214 may include comparison logic and/or hardware. The waypoint address list 216 can be used in scenarios other than the cryptographic scenarios. For example, the waypoint address list 216 can also be used when system 100 is powered on and the time-of-day is selected from two or more clock sources.

Notably, in some scenarios, the processors 102, 104 are driven from a common clock during the waypoint operations. This helps keep the processors in phase and avoids potential precession bugs. As noted above, the operations of the processors 102, 104 may become unsynchronized with each other. Every time the processors perform a write, the operations of the processors are held until the asynchronous ready signal is asserted by the waypoint decider 214. This configuration causes the operations of the processors 102, 104 to re-synchronized with each other. As a result, the processors 102, 104 do not need to be in literal lock step with each other for system 100 to operate correctly.

It should also be noted that the waypoint-related circuitry 106 can include more or less components than that shown in FIG. 2. For example, the waypoint-related circuitry 106 can include a third comparator for determining whether both processors 102, 104 are writing at the same time and/or reading at the same time. If the processors are not writing or reading at the same time, then a waypoint violation is deemed to have occurred. Alternatively or additionally, this additional comparison operation can be performed by the waypoint decider 214 or other component external to the waypoint decider 214 and/or the waypoint-related circuitry 106.

It should also be noted that processors generally have two states of processing, namely a normal state and an interrupt state. In the interrupt state, the processor processes interrupts which are external signals controlled by something happening external to the processor. When an interrupt happens, the processor remembers where it was in its normal processing and then processes a separate interrupt service routine. Upon completion of the interrupt service routine, the processor restores wherever it was in its normal processing.

During operations, an interrupt signal may be simultaneously received by the processors 102, 104. At this time, both processors 102, 104 are ready to execute the same instruction (e.g., instruction "eight"). However, the operations of the processors 102, 104 are not exactly synchronized with each other. As such, processor 102 processes the interrupt service routine before instruction eight, while processor 104 begins executing instruction number eight. Therefore, the processors 102, 104 are doing very different operations for at least one cycle or until processor 104 begins processing the interrupt service routine. Imagine, however, that instruction number eight is a write to register 124 and the interrupt service routine is a write to register 122. As a result, system 100 is configured such that interrupt service routines shall not write to registers protected by the waypoint circuitry 106, such as registers 122, 124. However, the interrupt service routine requires a write register 122, 124. Instead of writing to register 122, 124 during the interrupt service, the interrupt service routine signals a task to be performed by the processors 102, 104. The tasks have an associated identifier value that is unique to each task on each processor 102, 104, but common between the identical tasks on those processors.

In some scenarios, more than one task may be signaled or scheduled during an interrupt service routine. The tasks may be activated by the processors in different orders. The following Race Condition Resolution ("RCR") algorithm may be employed which ensures that the processors make identical task dispatch decisions in such a scenario, i.e., such that the waypoint-related circuitry causes processor 102 to make identical dispatch decisions for first tasks scheduled during a first interrupt service routine performed thereby as those of processor 104 for second tasks scheduled during a second interrupt service routine performed thereby.

The RCR algorithm consists of scheduling algorithm executing on processors 102, 104. Prior to dispatching a task, each processor communicates to the other processor the identifier value of the task intended to be dispatched. This communication may occur via any communication mechanism available to the processors within system 100, such as a serial or parallel communication interface or a shared memory array accessible by the two processors. If the task identifiers selected by both processors 102, 104 match in value, each processor dispatches that task to execute next. If the tasks identifiers do not match, an arbitration algorithm is used to reach agreement on the next task to dispatch. That arbitration algorithm may be any mechanism that causes the same task to be dispatched by both processors. Example algorithms include (1) selection of the lower value of the two task identifiers, (2) selection of the higher priority of the two task identifiers, or (3) causing a first processor 104, for example, to always defer to a second processor (e.g., processor 102). Regardless of the algorithm selected, the end result is that both processors 102, 104 select the same task to dispatch, thereby ensuring that the processors remain synchronized.

Referring now to FIGS. 3A-3D, there is provided a flow diagram of an exemplary method 300 for synchronizing processors that is useful for understanding the present invention. Method 300 is described below in relation to a plurality of steps having a particular order. The order of these steps is only exemplary. The invention is not limited to this exemplary order shown in FIGS. 3A-3D.

Figure 3A:
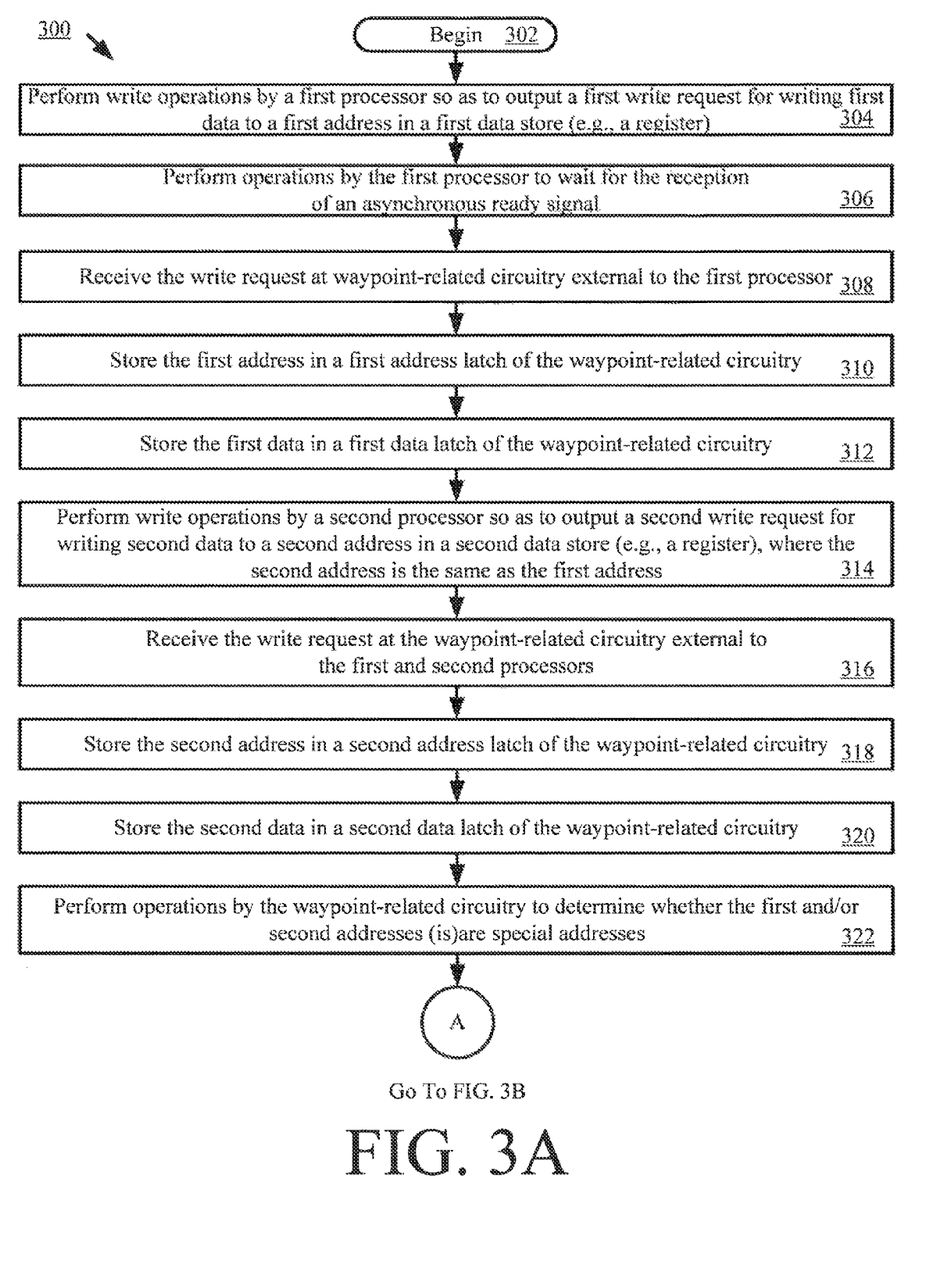
FIGS. 3A-3D collectively provide a flow diagram of an exemplary method for synchronizing processors.

As shown in FIG. 3A, method 300 begins with step 302 and continues with step 304. Step 304 involves performing write operations by a first processor (e.g., processor 102 of FIGS. 1-2) so as to output a first write request (e.g., write request 250 of FIG. 2) for writing first data (e.g., data 262 of FIG. 2) to a first address (e.g., address 260 of FIG. 2) in a first data store (e.g., register 122 of FIGS. 1-2). Next in step 306, the first processor performs operations to wait for the reception of an asynchronous ready signal (e.g., asynchronous ready signal 254 of FIG. 2).

Thereafter, step 308 is performed where the write request is received at waypoint-related circuitry (e.g., waypoint-related circuitry 106 of FIGS. 1-2). Waypoint-related circuitry is external to the first processor. At the waypoint-related circuitry, the first address is stored in a first address latch (e.g., address latch 202 of FIG. 2), as shown by step 310. Also, the first data is stored in a first data latch (e.g., data latch 204 of FIG. 2), as shown by step 312.

In a next step 314, a second processor (e.g., processor 104 of FIGS. 1-2) performs write operations so as to output a second write request (e.g., write request 252 of FIG. 2) for writing second data (e.g., data 266 of FIG. 2) to a second address (e.g., address 264 of FIG. 2) in a second data store (e.g., register 124 of FIGS. 1-2). The write request is then received by the waypoint-related circuitry, as shown by step 316. The waypoint-related circuitry is also external to the second processor. At the waypoint-related circuitry, the second address is stored in a second address latch (e.g., address latch 206 of FIG. 2), as shown by step 318. Also, the second data is stored in a second data latch (e.g., data latch 208 of FIG. 2).

Figure 3B:
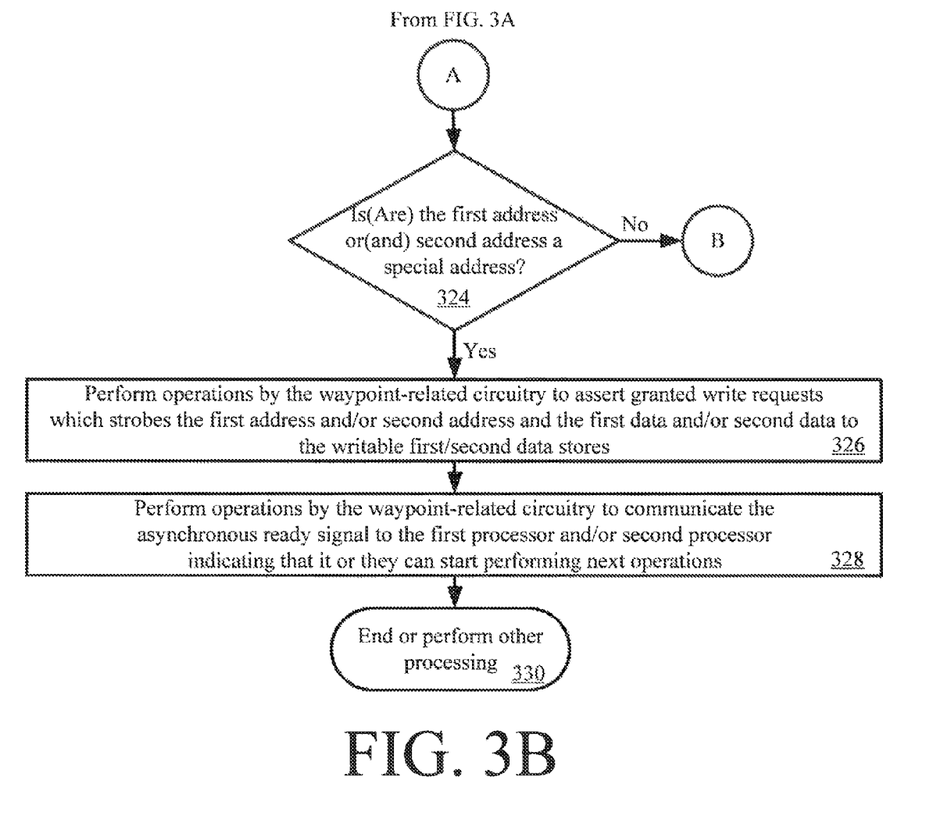

Upon completing step 320, step 322 is performed where the waypoint-related circuitry performs operations to determine whether the first and/or second addresses is(are) special addresses. The special addresses can include, but are not limited to, those that are contained in a waypoint address list (e.g., waypoint address list 216 of FIG. 2). Upon completing step 322, method 300 continues with step 324 of FIG. 313. If the first and/or second addresses (is) are not special addresses [324:NO], then method 300 continues with step 332 of FIG. 3C. Step 332 will be described below. If the first and/or second addresses (is) are special addresses [324:YES], then steps 326-330 are performed. Step 326 involves performing operations by the waypoint-related circuitry to assert granted write requests which strobes the first/second addresses and first/second data to the writable first/second data stores. Step 328 involves performing operations by the waypoint-related circuitry to communicate the asynchronous read signal to the first/second processors indicating that they can start performing next operations. Thereafter, step 330 is performed where method 300 ends or other processing is performed.

Figure 3C:
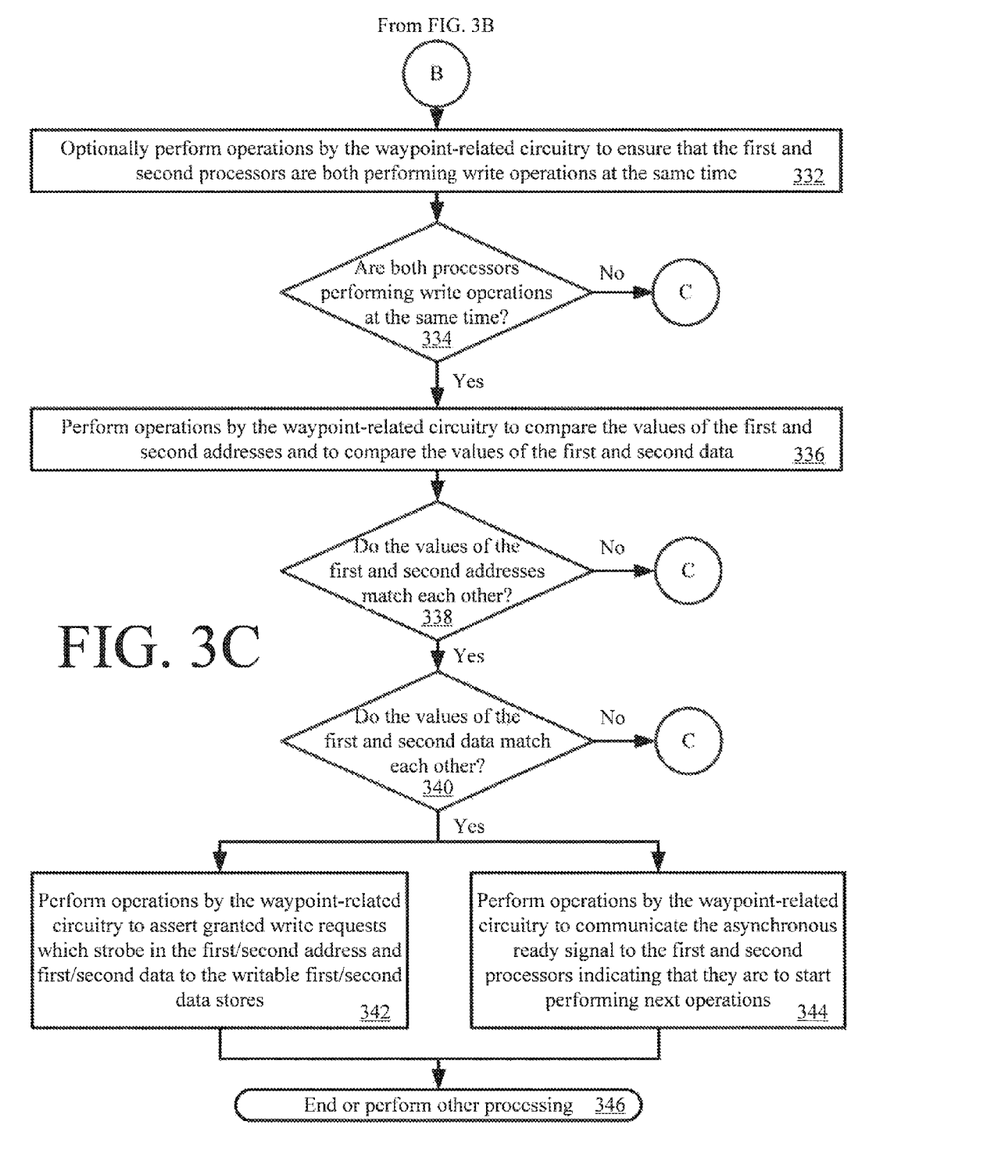

Referring now to FIG. 3C, various steps are performed when the first/second addresses are not special addresses. These steps include optional steps 332 and 334. Step 332 involves performing operations by the waypoint-related circuitry to ensure that the first and second processors are both performing write operations at the same time. If both processors are not performing write operations at the same time [334:NO], then method 300 continues with step 348 of FIG. 3D. Step 348 will be described below. If both processors are performing write operations at the same time [334:YES], then step 336 is performed where operations are performed by the waypoint-related circuitry to compare the values of the first and second addresses and to compare the values of the first and second data. If the values of the first and second addresses do not match each other [338:NO], then method 300 continues with step 348 of FIG. 3D. If the values of the first and second addresses do match each other [338:YES], then a decision step 340 is performed. If the values of the first and second data do not match each other [340:NO], then method 300 continues with step 348 of FIG. 3D. If the values of the first and second data do match each other [340:YES], then steps 342 and 344 are simultaneously performed. Step 342 involves performing operations by the waypoint-related circuitry to assert granted write requests which strobe in the first/second address and first/second data to the writable first/second data stores. Step 344 involves performing operations by the waypoint-related circuitry to communicate the asynchronous ready signal to the first and second processors indicating that they are to start performing next operations. Upon completing steps 342 and 344, step 346 is performed where method 300 ends or other processing is performed.

Figure 3D:
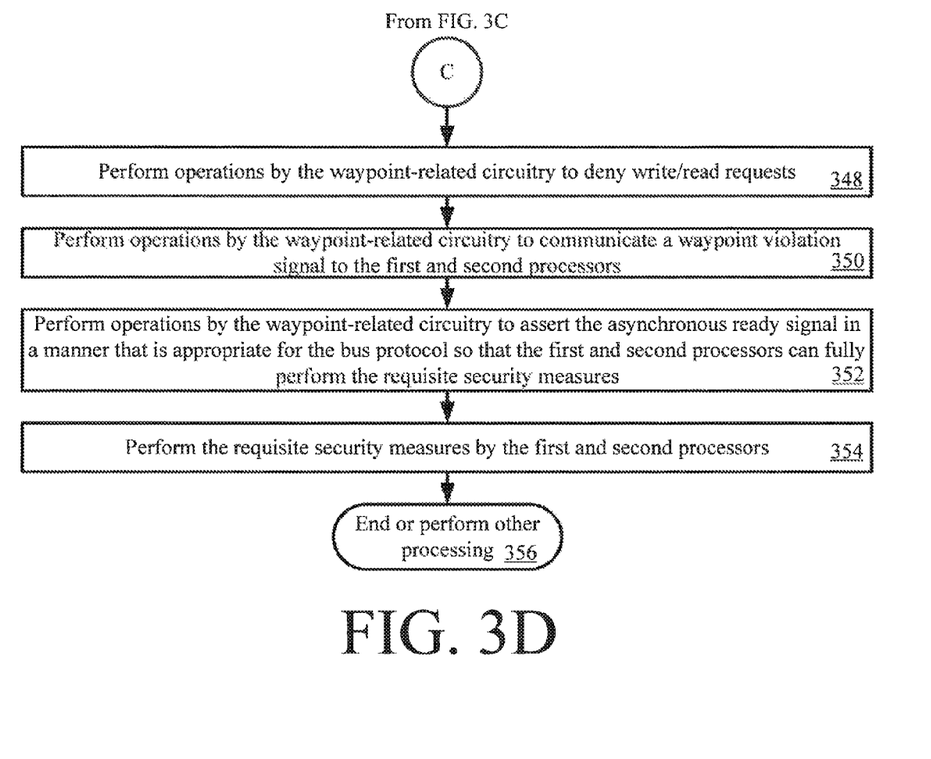

As noted above, if certain conditions are not met, then method 300 continues with step 348 of FIG. 3D. These conditions include, but are not limited to, conditions which indicate that a waypoint violation has occurred. For example, if both processors are not performing write operations at the same time, then a waypoint violation is deemed to have occurred. Similarly, if the values of the first and second addresses do not match each other, then a waypoint violation is deemed to have occurred. Likewise, if the values of the first and second data do not match each other, then a waypoint violation is deemed to have occurred.

When a waypoint violation is deemed to have occurred, then the system (e.g., system 100 of FIGS. 102) of the present invention performs certain security measures. For example, in step 348, the waypoint-related circuitry denies the write/read requests. The waypoint-related circuitry also performs operations to communicate a waypoint violation signal to the first and second processors, as shown in step 350. The waypoint-related circuitry further performs operations to assert the asynchronous ready signal in a manner that is appropriate for the bus protocol so that the first and second processors can fully perform the requisite security measures, as shown by step 352. In a next step 354, the first and second processors perform the requisite security measures, such as clearing or overwriting all memory space and stopping all operations. Subsequently, step 356 is performed where method 300 ends or other processing is performed.

It is important to note that method 300 was described in the context of a data write. In a data read scenario, the method would be substantially similar to method 300 absent step 340.

In view of the forgoing, the present invention comprises a novel circuit that uses the bus-hold capabilities of busses in a novel way to accomplish a different purpose: (1) to tightly synchronize two or more processors, enabling bus data to be compared prior to committing to a bus read or write; and to redundant check bus writes between multiple processors to ensure both processors are functioning identically. The present invention has the ability to designate address ranges which are checked for integrity, and those which are not checked for integrity. The solution of the present invention may be (a) scaled to multiple processors and (b) scaled to check not only "writes" but also "reads". The solution can be extended to different sort of bus schemes, as long as there is an indication of transfer protocol complete which is either synchronous or time bounded.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A method for synchronizing operations of a plurality of processors, comprising:
   receiving by an electronic circuit a first request from a first processor for writing first data to or reading first data from a first address in a first data store;
   subsequently receiving by the electronic circuit a second request from a second processor for writing second data to or reading second data from a second address in a second data store;
   comparing, by the electronic circuit, values of the first and second addresses to each other and values of the first and second data to each other; and
   concurrently communicating an asynchronous ready signal from the electronic circuit to the first and second processors when the values of the first and second addresses match each other and the values of the first and second data match each other, where the asynchronous ready signal causes operations of the first and second processors to be synchronized in time with each other.

2. The method according to claim 1, wherein the following operation is simultaneously performed with the concurrently communicating step by the electronic circuit: asserting at least one granted write request or read request made by at least one of the first processor and the second processor.

3. The method according to claim 1, further comprising performing the following operations by the electronic circuit when the values of the first and second addresses do not match each other or the values of the first and second data do not match each other:
   communicating a waypoint violation signal to the first and second processors; and
   asserting the asynchronous ready signal so that the first and second processors can fully perform requisite security measures.

4. The method according to claim 1, further comprising determining by the electronic circuit whether at least one of the first address and the second address is contained in a pre-defined list or policy.

5. The method according to claim 4, further comprising performing the following operations by the electronic circuit if it is determined that at least one of the first address and the second address is contained in the pre-defined list or policy:
   asserting at least one granted write request or read request made by at least one of the first processor and the second processor; and
   communicating an asynchronous ready signal to the first and second processors.

6. The method according to claim 1, further comprising performing operations by the electronic circuit to determine if the first and second processors are both performing write operations or read operations at the same time or within a pre-specified time window.

7. The method according to claim 6, further comprising performing the following operations by the electronic circuit if it is determined that the first and second processors are not both performing write operations or read operations at the same time or within a pre-specified time window:
   communicating a waypoint violation signal to the first and second processors; and
   asserting an asynchronous ready signal so that the first and second processors can fully perform requisite security measures.

8. The method according to claim 7, wherein the asynchronous ready signal is continuously or periodically asserted.

9. The method according to claim 1, further comprising performing operations by the first processor such that a first task is scheduled each time a write to the first data store is to be performed during a first interrupt service routine.

10. The method according to claim 9, further comprising performing operations by the electronic circuit to cause the first processor to make identical dispatch decisions for the first tasks scheduled during the first interrupt service routine as those of the second processor for second tasks scheduled during a second interrupt service routine.

11. A system, comprising:
   at least one electronic circuit configured to;
   receive a first request from a first processor for writing first data to or reading first data from a first address in a first data store;
   subsequently receive a second request from a second processor for writing second data or reading second data from a second address in a second data store;
   compare values of the first and second addresses to each other and values of the first and second data to each other; and
   concurrently communicate an asynchronous ready signal to the first and second processors when the values of the first and second addresses match each other and the values of the first and second data match each other, where the asynchronous ready signal causes operations of the first and second processors to be synchronized in time with each other.

12. The system according to claim 10, wherein the electronic circuit is further configured to assert at least one granted write request or read request made by at least one of the first processor and the second processor, when the values of the first and second addresses match each other and the values of the first and second data match each other.

13. The system according to claim 10, wherein the electronic circuit is further configured to perform the following operations when the values of the first and second addresses do not match each other or the values of the first and second data do not match each other:
   communicate a waypoint violation signal to the first and second processors; and
   assert the asynchronous ready signal so that the first and second processors can fully perform requisite security measures.

14. The system according to claim 10, wherein the electronic circuit is further configured to determine whether at least one of the first address and the second address is contained in a pre-defined list or policy.

15. The system according to claim 14, wherein the electronic circuit is further configured to perform the following operations if it is determined that at least one of the first address and the second address is contained in the pre-defined list or policy:
   assert at least one granted write request or read request made by at least one of the first processor and the second processor; and
   communicate an asynchronous ready signal to the first and second processors.

16. The system according to claim 1, wherein the electronic circuit is further configured to determine if the first and second processors are both performing write operations or read operations at the same time or within a pre-specified time window.

17. The system according to claim 16, wherein the electronic circuit is further configured to perform the following operations if it is determined that the first and second processors are not both performing write operations or read operations at the same time or within a pre-specified time window:
   communicate a waypoint violation signal to the first and second processors; and
   assert an asynchronous ready signal so that the first and second processors can fully perform requisite security measures.

18. The system according to claim 17, wherein the asynchronous ready signal is continuously or periodically asserted.

19. The system according to claim 10, wherein the first processor schedules a first task each time a write to the first data store is to be performed during a first interrupt service routine.

20. The system according to claim 19, wherein the electronic circuit is further configured to cause the first processor to make identical dispatch decisions for the first tasks scheduled during the first interrupt service routine as those of the second processor for second tasks scheduled during a second interrupt service routine.

* * * * *